US010187791B2

(12) United States Patent
Jaman et al.

(10) Patent No.: US 10,187,791 B2
(45) Date of Patent: Jan. 22, 2019

(54) WORKSTATION AND CLIENT DEVICE PAIRING

(71) Applicant: HRB Innovations, Inc., Las Vegas, NV (US)

(72) Inventors: Mani Jaman, Overland Park, KS (US); Kenneth Meade, Jr., Overland Park, KS (US); Umapathy Selvamoni, Olathe, KS (US); Mark A. Nuetzmann, Liberty, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 261 days.

(21) Appl. No.: 15/092,148

(22) Filed: Apr. 6, 2016

(65) Prior Publication Data
US 2017/0295242 A1 Oct. 12, 2017

(51) Int. Cl.
H04W 12/04 (2009.01)
H04L 29/06 (2006.01)

(52) U.S. Cl.
CPC ......... H04W 12/04 (2013.01); H04L 63/0853 (2013.01); H04L 63/083 (2013.01)

(58) Field of Classification Search
CPC ............. G06F 3/0481; G06F 17/30905; G06F 2209/509; G06F 17/60864; G06F 17/30867; G06F 21/10; G06F 21/128; G06F 21/33; G06F 21/44; G06F 21/53; G06F 2221/033; G06F 2221/0704; G06F 2221/0713; G06F 9/00; G06Q 30/06; G06Q 20/202; G06Q 20/3674; G06Q 20/382; G06Q 20/3829; G06Q 20/385; G06Q 20/40; G06Q 2220/00; G06Q 30/0269; H04L 51/046; H04L 63/083; H04L 63/0853; H04L 12/1859; H04L 2209/56; H04L 63/10; H04L 63/102; H04L 65/1063; H04L 65/1069; H04L 67/10; H04L 67/16; H04L 67/306; H04L 67/42; H04L 9/3228; G08C 17/02
See application file for complete search history.

(56) References Cited

U.S. PATENT DOCUMENTS 7,965,983 B1 * 6/2011 Swan ................... H04L 63/0485
455/41.1
8,316,237 B1 * 11/2012 Felsher ................. H04L 9/0825
380/282
2004/0143394 A1 * 7/2004 McIntyre ................ G06F 21/31
702/1

(Continued)

Primary Examiner — Greg C Bengzon
(74) Attorney, Agent, or Firm — Erise IP, P.A.

(57) ABSTRACT

To assist a professional with performing professional services, a client device is paired to a workstation via a server. The workstation creates a code indicative of the workstation and displays the code on a display of the workstation such that the client device can capture the code. The server is communicatively coupled with the workstation and the client device. The server is configured to receive a set of credentials from the client device, including information indicative of the code that was displayed on the workstation. The server analyzes the set of credentials to identify said workstation and pairs the client device with the workstation based upon said analysis of the code. The pairing allows the client device and the workstation to share information to assist the professional with performing professional services.

19 Claims, 4 Drawing Sheets

(56) References Cited

U.S. PATENT DOCUMENTS

| | | | |
|---|---|---|---|
| 2007/0198436 A1* | 8/2007 | Weiss | G06F 21/32 705/75 |
| 2008/0065546 A1* | 3/2008 | Ramachandran | G06Q 20/0425 705/44 |
| 2009/0172565 A1* | 7/2009 | Jackson | H04L 67/1095 715/753 |
| 2010/0082481 A1* | 4/2010 | Lin | G06Q 20/042 705/41 |
| 2012/0173433 A1* | 7/2012 | Park | G06Q 20/3674 705/67 |
| 2012/0322384 A1* | 12/2012 | Zerr | H04L 67/303 455/41.3 |
| 2013/0179336 A1* | 7/2013 | Lyons | G06Q 20/30 705/39 |
| 2014/0033286 A1* | 1/2014 | Zhang | H04L 63/083 726/7 |
| 2014/0108263 A1* | 4/2014 | Ortiz | G06Q 20/3278 705/71 |
| 2014/0164934 A1* | 6/2014 | Yang | G06F 17/3089 715/738 |
| 2014/0177469 A1* | 6/2014 | Neyhart | H04L 12/2807 370/254 |
| 2014/0180863 A1* | 6/2014 | Ganesan | G06Q 30/0611 705/26.4 |
| 2014/0257047 A1* | 9/2014 | Sillay | A61B 5/11 600/301 |
| 2014/0304132 A1* | 10/2014 | McHugh | G06Q 20/40 705/35 |
| 2014/0337093 A1* | 11/2014 | Jain | G06Q 30/0201 705/7.29 |
| 2015/0095998 A1* | 4/2015 | Christmas | H04L 63/10 726/6 |
| 2015/0120813 A2* | 4/2015 | Robbin | H04L 65/60 709/203 |
| 2015/0178721 A1* | 6/2015 | Pandiarajan | G06Q 20/382 705/75 |
| 2015/0269388 A1* | 9/2015 | Christmas | G06F 21/62 705/21 |
| 2015/0379209 A1* | 12/2015 | Kusuma | H04L 67/2823 705/3 |
| 2016/0110537 A1* | 4/2016 | Harrison | H04L 67/16 705/14.66 |
| 2016/0171492 A1* | 6/2016 | Carrott | G06Q 20/3829 705/71 |
| 2016/0262017 A1* | 9/2016 | Lavee | G06F 21/31 |
| 2016/0277930 A1* | 9/2016 | Li | H04L 41/28 |
| 2016/0300258 A1* | 10/2016 | Chao | G06Q 30/0225 |

* cited by examiner

WORKSTATION AND CLIENT DEVICE PAIRING

BACKGROUND

1. Field

Embodiments of the invention relate to the pairing of computing devices, such as a workstation and a client device.

2. Related Art

It is common for professionals of various types to perform professional services at a workstation or other computing device. To perform these services, the professional will often require responsive answers to questions presented to a client and documents, authentication, and other information from the client (on whose behalf the services are being performed). Typically, the professional will receive this information in various inefficient ways. As one example, a professional might simply ask the client for the desired information and enter the information manually. However, this method is inefficient and time consuming. As another example, the professional may ask the client to complete a requested questionnaire prior to the provision of the services. However, this method also requires manual entry and is inefficient. This method also often fails to capture additional information that becomes necessary during the provision of the services, or requires the client to provide an excessive amount of information just in case it become relevant during the provision of the services.

What is lacking in the prior art is a way to efficiently and securely retrieve information from a client that is necessary for the provision of professional services.

SUMMARY

Embodiments of the invention solve the above-mentioned problems by providing a computer program, a system, and a method for efficiently and securely pairing a client device to a workstation. By pairing the devices, the client can enter information directly before and during provision of professional services, review the work that is being done, and perform other functions to increase efficiency.

A first embodiment of the invention is generally directed to a system for pairing a client device to assist a professional with performing professional services, the system comprising a workstation and a server. The workstation is associated with the professional. The workstation creates a code indicative of the workstation and displays the code on a display of the workstation such that the client device can capture the code. The server is communicatively coupled with the workstation and the client device. The server is configured to receive a set of credentials from the client device, including information indicative of the code that was displayed on the workstation. The server analyzes the set of credentials to identify said workstation and pairs the client device with the workstation based upon said analysis of the code. The pairing allows the client device and the workstation to share information to assist the professional with performing professional services.

A second embodiment of the invention is generally directed to a system to assist a professional with performing professional services, the system comprising a first computing device, a second computing device, and a server. The first computing device is configured to present a code indicative of the first computing device. The first computing device displays the code on a display of the first computing device. The second computing device is configured to capture the code displayed on the display of the first computing device. The server is communicatively coupled with the first computing device and the second device. The server is configured to receive a set of credentials from the second computing device, which includes information indicative of the code that was displayed on the first computing device. The server analyzes the set of credentials to identify the first computing device. The server pairs the first computing device with the second computing device based upon said analysis of the code. The pairing allows the first computing device and the second computing device to share information to assist the professional with performing professional services.

A third embodiment of the invention is generally directed to a computerized method of pairing a client device to a workstation, wherein the client device is associated with a client and the workstation is associated with a professional performing professional services. The method comprises the following steps: acquiring a set of workstation information from the workstation that is indicative of the workstation; receiving a set of credentials from the client device, wherein at least a portion of the set of credentials includes information indicative of a code displayed on a display of the workstation, said code being captured by the client device; comparing the set of credentials to the set of workstation information to determine that the client device should be paired to the workstation; and pairing the client device to the workstation such that the client device and the workstation are configured to exchange information.

Other embodiments of the invention are also directed to a non-transitory computer readable medium having a computer program stored thereon, wherein the computer program instructs at least one processing element to perform the various steps discussed herein. Still other embodiments of the invention are generally directed to a pairing engine for pairing a first computing device to a second computing device based at least in part on a code displayed by the first computing device and captured by the second computing device.

BRIEF DESCRIPTION OF THE DRAWING FIGURES

Embodiments of the invention are described in detail below with reference to the attached drawing figures, wherein.

Figure 1:
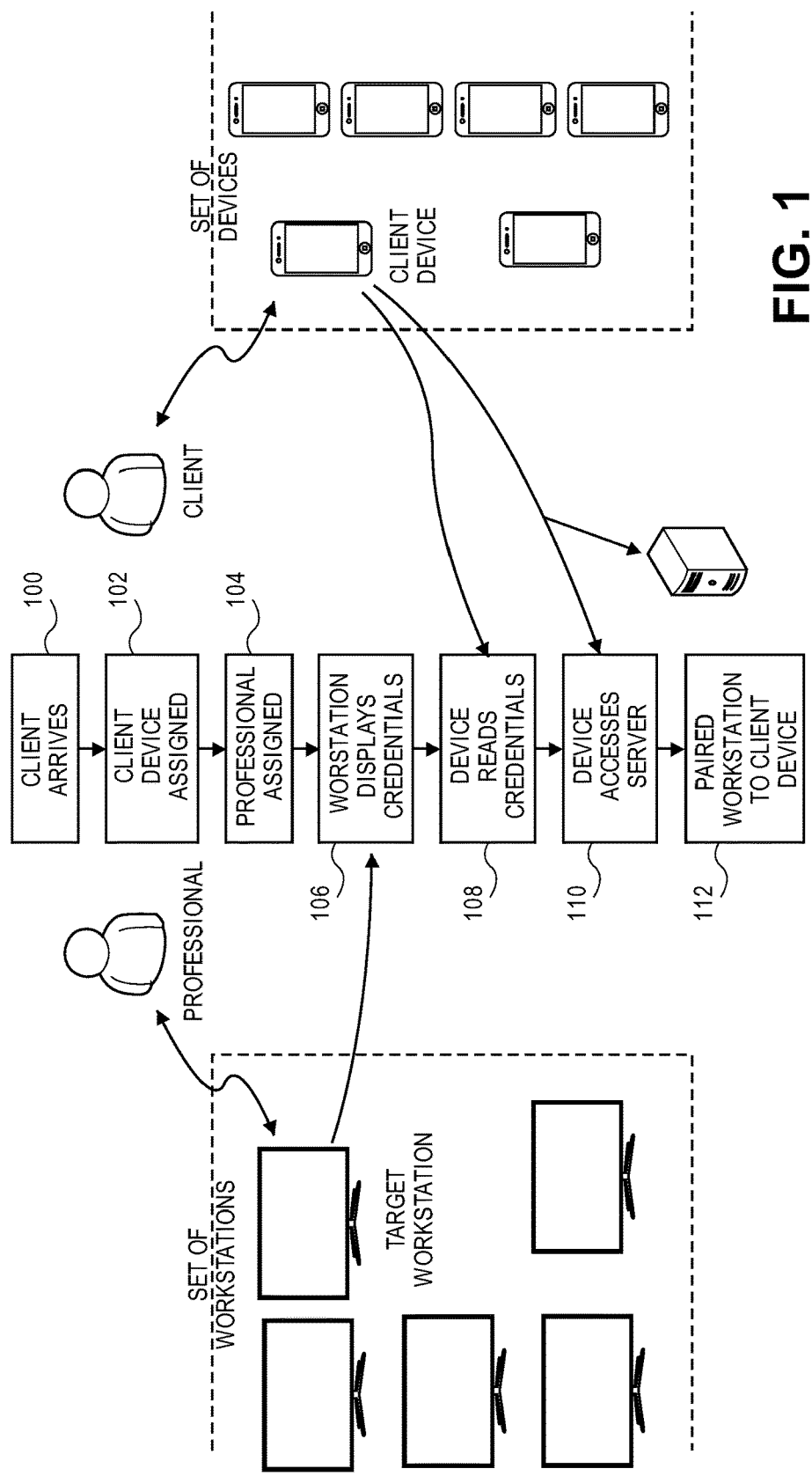
FIG. 1 is a flow diagram generally illustrating how a workstation is paired to a client device in an embodiment of the invention.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a computerized method, and a system for pairing computing devices. Pairing is performed at least in part by one computing devices taking a photograph, scanning, or otherwise acquiring a code displayed by the other computing device. This allows the device that is performing the pairing, such as a server, to ensure that the two devices are physically proximate to one another and that the operators of the respective devices intend that the devices be paired. Once the devices are paired, the devices can freely transmit information between themselves, in embodiments of the invention, through the server. This allows the operators of the two devices to work together on a common project or task, such as the provision of professional services.

Turning to the figures, an exemplary embodiment of the invention is illustrated in FIG. 1. Broadly, FIG. 1 shows how the workstation is paired to the device. While any of numerous implementations are possible, FIG. 1 depicts an implementation in which the workstation is utilized by a professional to perform professional services. The professional services are performed by the professional on behalf of the client. The client is physically present and located near the workstation and the professional. In this way, the client may assist the professional in performing the professional services, receive answers to questions, monitor the progress of the professional services, and the like.

In Step 100, the client arrives or otherwise interfaces with the system. In the embodiment as illustrated, the client comes physically to a professional location associated with the professional and/or the workstation. In other embodiments, the professional may arrive physically to the location of the client, or the client and the professional may be remote from one another, with the client and the professional being able to communicate directly.

In Step 102, the client device is assigned to the client. In some embodiments of the invention, the client device is owned and/or controlled by the tax professional. For example, the tax professional may have a set of devices configured for client usage at the professional location. When the client arrives at the professional location, the client is checked in or otherwise welcomed. The client may then be given the client device to use during the client's visit at the professional location.

In Step 104, a professional is assigned to interact with the client. The professional may be selected from a pool of available professionals, based upon various criteria such as the type of professional services needed by the client, the skills possessed by the professional or professionals, prior existing relationships, and the like. The client may have an appointment with a specific professional, or may be assigned a professional after arriving.

In Step 106, a workstation associated with the professional generates and displays a set of credentials. The credentials will be utilized to verify and pair the client device to the workstation. For example, the professional, upon receiving the client at or near the workstation, may provide an input to the computer that a new client has arrived. The workstation will then generate and display the set of credentials for the client device.

In Step 108, the client device reads and analyzes the credentials. This step may be performed by the client device taking a photograph of the credentials, scanning a code associated with the credentials, receiving user input indicative of the credentials, or the like.

In Step 110, the client device accesses a server to report the credentials. The server is typically associated with the professional. The server will verify the credentials to determine which workstation is to be paired with the client device. The server may compare the credentials against information indicative of a set of workstations.

In Step 112, the client device and the workstation are paired. While paired, the client device and the workstation can share information therebetween either directly or through the server. The client device may show information relevant to the professional services being provided by the professional, request information from the client, display a checklist of tasks to be accomplished, or otherwise assist the client and/or the professional.

Figure 2:
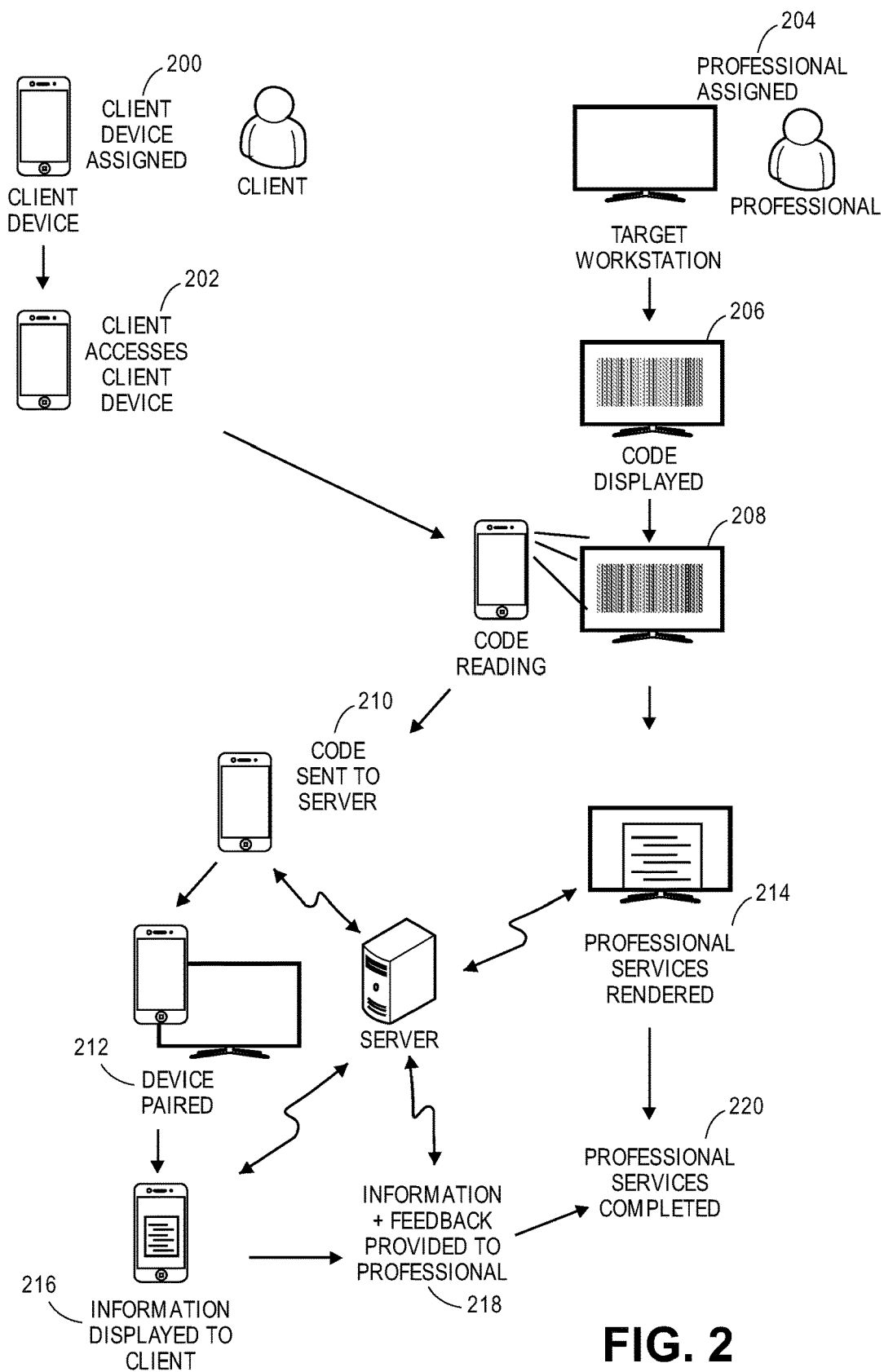
FIG. 2 is a flow diagram illustrating a system comprising the workstation, the client device, and a server.

FIG. 2 illustrates a system for pairing a client device to a workstation to assist in the performance of professional services. In some embodiments of the invention, the system comprises the workstation, the server, and the client device. In other embodiments of the invention, the system comprises the workstation and the server. The system may additionally comprise a set of workstations and/or a set of client devices, such as illustrated in FIG. 1. The system pairs the client device with the workstation to synthesize the efforts of the client and the professional and/or to provide information to the client about the professional services that are being provided by the professional.

In Step 200, the client device is assigned, designated, accessed, or otherwise identified with the client. In embodiments of the invention, the client device is a mobile computing device, such as a smart phone, a tablet computer, a laptop computer, a smart watch, or other personal/wearable technology. The client device may have a non-transitory computer readable medium thereon with a computer program stored thereon. The computer program instructs at least one processor to perform the discussed steps. The client device may be assigned when the client makes an appointment to see the professional, upon the client arriving at the professional location, while the client is waiting for the professional to be available, when the client arrives at the workstation, when the professional services are incipient, or another time and location.

In embodiments of the invention, the client device is provided at the professional location. In other embodiments, the client device is owned and/or controlled by the client. In these embodiments, when the client arrives, the client may be directed to download an application for their smartphone, or to navigate to a certain website. This app or website may then perform the function discussed below. In some embodiments, the client may be presented with a choice of whether to use the available client device from the professional or to use their own smart phone or tablet.

In Step 202, the client accesses or otherwise utilizes the client device. The client device is configured to be utilized by the client before, during, and/or after the provision of the professional services. For example, the client device may be utilized by the client to input preliminary information that the professional will need to perform the professional services, to review the work being performed by the professional, to answer inquiries during the performance of the professional services, to scan or photograph documents and other information that may be necessary for the professional services, to be provided with information related to the professional services. The client may log into or create a client account (as discussed below), input the type of professional services requested, answer preliminary questions about the client's situation, and provide other preliminary information to the client device.

In Step 204, a professional is assigned, designated, nominated, or otherwise identified. The professional may have a scheduled appointment with the client, the client may have a general appointment at the professional location, or the client may walk in with no scheduled appointment. In whatever fashion, the professional is designated to perform professional services for the client.

In Step 206, the workstation generates a set of credentials for the workstation and/or the professional. The set of credentials includes information about the workstation and/or the method in which the workstation may be identified. For example, the set of credentials may include an internet protocol ("IP") address for the workstation, a hardware address (such as a "MAC address") of the workstation, an assigned identification number and/or name of the workstation, an identification number and/or or name of the professional associated with the workstation, or other identifying information. In embodiments of the invention, the set of credentials, or a portion thereof, are then formed into a code for display. In other embodiments of the invention, information indicative of the set of credentials are displayed on the screen in another form than a code form, such as an alphanumeric sequence or the like.

In some embodiments, the code is relatively simple. For example, the code may only provide the fourth octet of the IP address of the workstation. The client device may then take the first three octets of its own IP address and replace the fourth octet with the code from the workstation to arrive at the IP address of the workstation. In this way, the code is both simple (in that it relays a small amount of information) and secure (in that the code is meaningless unless the device has the same initial three octets by being connected to the same server).

In other embodiments, the code is relatively complex. For example, the code may include information indicative of the IP address of the workstation, the MAC address of the workstation, and the name or number of the professional. The code may also include information indicative of the client that is expected to be paired with the workstation. The workstation may know (such as from a schedule or via receipt of an electronic message) the name or account number of the next expected client. The code may therefore include this information, such that the client device and/or the server can confirm that the client device is scanning the correct workstation. This will prevent the client from inadvertently (or maliciously) pairing to the incorrect workstation.

In Step 208, the client device reads or otherwise acquires the code from the workstation. In embodiments of the invention, the code is displayed on a display of the workstation (such as a computer monitor or a secondary display). The client device then photographs, scans, or otherwise acquires the code from the workstation. It should be appreciated that the acquisition of the code is performed by a method other than direct electronic communications. The professional may instruct the workstation to generate and display the code. In other embodiments, the code may be continuously displayed such that the client device may read it at any time. The client may instruct the client device to photograph or scan the code.

In Step 210, the client device sends the code to a server. In some embodiments of the invention, the client device sends information indicative of the code to the server (or may send the entire code itself). For example, the client device may send the decoded IP address of the workstation. The client device may also send to the server information indicative of the client and/or the client device. The client device may send client account information to the server to instruct the workstation to associate the client account with the professional services to be rendered. For example, the client may log into or provide authentication to the client device prior to scanning the code. The client device may have a fingerprint scanner, facial recognition software, or other method of authenticating the user. The server may then pair the workstation with the client device as well as provide information to the workstation on the client and/or the services requested.

The client device is communicatively coupled with the server, such as via a wireless (e.g., WiFi or Bluetooth) or wired (e.g., Ethernet cable) connection. The server may be local to the professional location or may be remote. In other embodiments, the client device may communicate directly with the workstation via a router or other network architecture. The information sent may include any of the following: information regarding the workstation for pairing, information regarding a location or set to which the workstation belongs, information regarding the professional associated with the workstation, authentication of the client, authentication of the client device, information regarding a client account, information regarding services requested, and similar information.

In Step 212, the client device is paired with the workstation. Upon pairing, the workstation and the client device are configured to freely transfer information therebetween. In embodiments of the invention, the paired devices communicate through a server, router, or other computerized device. The paired devices may then share status updates, checklists, and other information regarding the client and/or the professional services. Items checked or completed on one device will be automatically reflected on the other device.

In Step 214, the professional renders the professional services which the client has requested or needs. Numerous exemplary fields for which the invention may be utilized are discussed below. Typically, the professional will prepare documents, provide advice, and/or record the interaction between the client and the professional.

In Step 216, information indicative of the professional services being rendered are displayed on the client device. Information is shared with the client device from the workstation via the pairing discussed above. The information may include explanatory summaries of the concepts or services, requests for responses, the professional documents or information for review by the client, other related information to occupy the client during the rendering of the services by the professional, and other information that is related or relevant to the professional services.

In Step 218, the client provides the requested information and feedback to the workstation. This provides an easy and efficient way for the information to be entered into the system. For example, if the professional needs to know the client's work address, the client may simply enter the work address directly into the client device. The work address will then be automatically shared with the workstation. In some embodiments, the workstation and/or the server may anticipate information that will be needed in rendering the professional services and request this information before the professional needs it. This will reduce latency and inefficiencies in the preparation of the professional services.

In Step 220, the professional services are completed, based upon the information and feedback from the client as well as the work of the professional. Upon completion, the client may review the work on the client device, approve the work, and/or send himself or herself a copy of the work. The work may also be submitted to a third party, agency, or the like. The client may also pay for the services via the client device. The client may also return the client device to the professional (unless the client device is owned by the client), such that the client device may be utilized by another future client.

Figure 3:
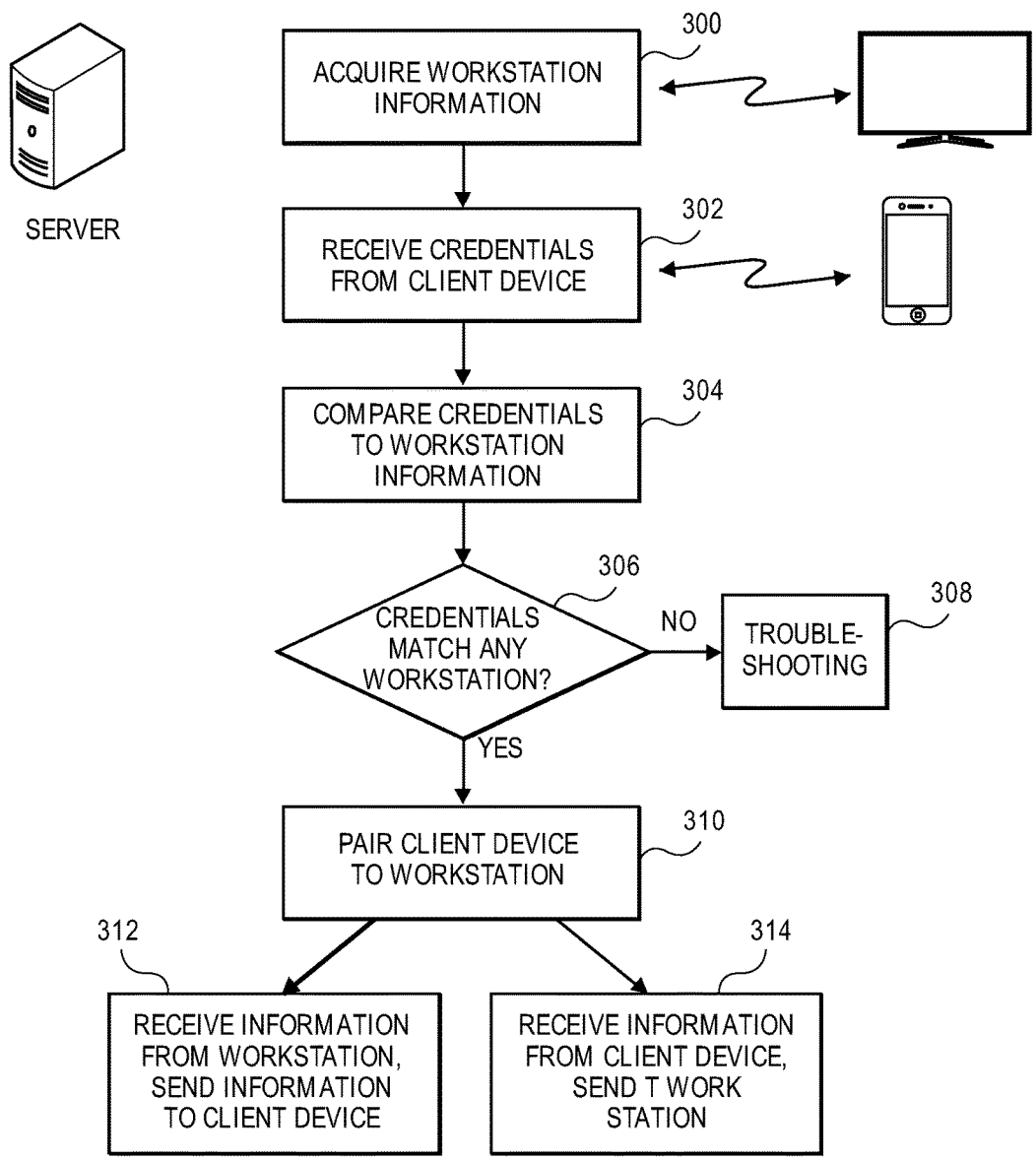
FIG. 3 is a flow diagram illustrating exemplary steps performed by the server.

FIG. 3 illustrates exemplary steps performed by the server. The server is communicatively coupled with at least one client device and/or at least one workstation. In some embodiments, the server is communicatively coupled with a set of workstations and a set of client devices, such as illustrated in FIG. 1. In some embodiments, the server may be local to the professional location. In other embodiments, the server is remote from the professional location. In either embodiment, the various devices may communicate with the server via various network architecture such as routers, hubs, switches, and the like.

In Step 300, the server acquires workstation information. The workstation information may include identifying information for the workstation and/or the associated professional with that workstation. Examples of workstation information include an IP address for the workstation, a MAC or other hardware address for the workstation, a workstation identification number, a group or set to which the workstation belongs, a professional that is associated with the workstation, a security password or other authentication information, or other authentication and identification information. The server may acquire workstation information for numerous workstations within a set of workstations, such as illustrated in FIG. 1.

In Step 302, the server receives credentials from the client device. The credentials from the client device may include the code from the workstation, as discussed above, client device information, client account information, and other authentication and identification information. The client device typically sends this information to the server once the client device is in physical proximity to the workstation. The client device is therefore requesting to be paired with the workstation as soon as possible. In some embodiments, the workstation may also send a message to the server indicative that a code has been displayed and indicative of information in that code. As such, the server will expect to receive a subsequent message from a client device including information indicative of the code. The close time proximity lends credence to the workstation and the client device being correctly paired together and reduces the likelihood of a malfeasant hacking in to receive access to the workstation.

In Step 304, the server compares the credentials to the workstation information. The server may compare the information to determine which workstation is to be paired with the client device. In Step 306, the server determines if the credentials match any workstation. The server may compare the credentials to a data store containing information relevant to the set of workstations. If the credentials do not match any workstation, in Step 308 the server may perform troubleshooting procedures. These could include determining if the client device is a malfeasant attempting to access the system, determining if the code was displayed or read in error, determining if the workstation may be associated with another server, etc.

In Step 310, if the credentials do match one of the workstations, the server will pair the client device to the workstation. This may include sending information to the workstation indicative of the client device. For example, the server may send instructions on how to send information to the client device, based upon the path through which the server received the information. In some embodiments, the server pairs the devices such the server will automatically send to a second device, any data received from a first device (and vice versa). In other embodiments, the server directs a switch, router, or other network architecture to direct at least a portion of the traffic from the first device to the second device.

In Step 312, the server receives information from the workstation and sends at least a portion of that information to the client device. In Step 314, the server receives information from the client devices and sends at least a portion of that information to the workstation. As with the other steps discussed herein, Steps 312 and 314 may be performed in any order and/or simultaneously.

In embodiments of the invention, at least a portion of the above-discussed steps are performed by a pairing engine. The pairing engine may be co-located with the server, the workstation, and/or the client device. The pairing engine may assign various unique codes (such as a security password) to confirm that the pairing is performed between the correct devices, and that the devices are actually proximate to one another.

For example, the pairing engine may comprise an "HttpListener" console application. The HttpListener is associated with a certain port associated with a .NET framework and generates a number pattern or other code, based upon the IP address of the workstation. The client device acquires the number pattern or code, and decodes the information to arrive at the full IP address of the workstation. The client device may then request the workstation using HTTP or another protocol via the server. The client device may thereafter poll the server on a designated interval to for content coming from the workstation. The server may also filter information that is designed for the client device and only send such information to the client device.

In embodiments of the invention, the client device may be paired with a second workstation. The second workstation may un-pair the client device from the first workstation, or the client device may remain paired to both workstations. For example, if the professional has a problem while performing the professional services, the professional may refer the client to a specialist or expert. If collocated, the client will then move from the professional to the specialist. The workstation of the specialist will then display a code. Upon the client device pairing with the specialist workstation, information regarding the services provided thus far may be provided to the specialist, information regarding the services provide by the specialist may be concurrently or later sent to the professional's workstation. As another example, the client device may pair with a check-in workstation prior to being paired with the professional workstation. The check-in workstation may oversee the preliminary matters prior to the professional services, ask preliminary questions, provide preliminary information, etc.

In embodiments of the invention, the client device generates and displays the code. The code is then read by the workstation, such as by a camera, barcode reader, or scanner associated with the workstation. The workstation then sends information indicative of the code to the server. The server verifies that the workstation is to be paired with the specific client device. This essentially performs the functions as described above, but with the opposite device. It should be appreciated that the steps described herein could be utilized with either, or yet another type, of device.

A few exemplary fields that can utilized the invention will now be discussed. The exemplary field of tax preparation will be discussed in depth. Other exemplary fields will be discussed below. It should be appreciated that the field of tax returns and tax return preparations are only an exemplary field of the invention.

The "user" and/or the "client" is the person who is utilizing or interacting with the system, and specifically the client device. In the exemplary tax field, the user acts, or purports to act, on behalf of the taxpayer whose tax return is going to be prepared. Examples of users include the taxpayer, an authorized friend or family member of the taxpayer, a tax professional, a financial professional, or other person. In some embodiments, the user is connected to the system while the discussed steps are performed. In other embodiments, the user is no longer connected to the system while the discussed steps are performed.

The user may connect to the system by utilizing the client device, such as a smart phone, a tablet computer, a laptop computer, a smart watch, and other computing devices (as discussed below). The client device may be provided by the tax professional or financial professional for temporary use by the client. The client device may additionally or alternatively belong to the client, such as the personal smart phone that the client uses every day.

In embodiments of the invention, the "professional" is a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing of tax related documents.

In other embodiments of the invention, the professional is a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional may utilize embodiments of the invention to assist customers in retaining documents generated or processed by the financial professional.

In the exemplary field of tax, the "professional services" may be the preparation of a tax return. The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. The tax return can be either written, digital, or a combination of both. In other embodiments, information relevant to the taxpayer and the tax to be paid are provided on other various forms and documents.

Tax returns are typically due in a tax return filing season following the tax year. A tax year is typically a calendar or fiscal year upon which the tax is calculated. A tax period may be another length of upon which the tax is calculated, such as a month, a quarter, half of a year, two years, five years, etc. It should be appreciated that the "current tax year" and "current tax period" as used herein, refers to the tax year or tax period for which the tax return relates. For example, a tax return submitted in March 2016 typically relates to the 2015 tax year. This is because the taxes accrue ending December 31 of the tax year and the tax return is submitted at some point in the following calendar year as prescribed by law (e.g., by April $15^{th}$). During the tax year, various tax-related documents may be provided to the user. As the user may not yet be legally allowed to file their tax return (because the user is currently in the tax year, prior to the tax return filing season) the user is required to store or file the document until such time that filing the tax return is permitted by law.

Various other exemplary fields will now be briefly discussed. It should be appreciated that these exemplary fields provide the reader with an understanding of potential ways in which the invention can be implemented. This disclosure is therefore not intended to be limiting, but instead provide easy-to-understand exemplary fields of embodiments of the invention.

Embodiments of the invention are directed to the exemplary field of banking, financial planning, investment advisory, insurance, and other financial services. For example, the professional may be a financial planner and the client is a person seeking the assistance of the financial planner. The client may provide information for the financial planner such as account information, investment information, etc., while the financial planner is providing an analysis of the financial situation of the client. As another example, the professional may be a banker and the client is a customer of the bank. The customer may scan checks for deposit, input loan request information, request account changes, and perform other banking functions from their smart phone (such as before arriving at the bank or while waiting to speak to the banker). Then, as the customer arrives at the bank, the banker may display the code to allow for the pairing of the banker's workstation and the customer's smart phone. The customer can then continue to input information, respond to queries from the banker, and understand what the banker is doing. This will expedite the professional services provided by the banker.

Embodiments of the invention are directed to the exemplary field of the practice of medicine, dentistry, physical therapy, and other medical services. For example, the professional may be a doctor and the client may be a patient. Upon arriving at a clinic or hospital, the client may input symptoms, medical history, and other information into a tablet computer assigned to the patient upon check-in. The patient may then use the tablet computer to provide additional information, understand diagnoses, and sign documents. The patient tablet computer may pair with a nurse's workstation, a doctor's workstation, a specialist's workstation, and a check-out workstation while at the clinic or hospital. In this way, the patient is kept informed as to what is going on, and the information input by the patient does not have to be repetitively entered.

Embodiments of the invention are directed to the exemplary field of administrative or government agencies. The administrative agency may be associated with a government entitlement program, such as the Social Security Administration or Medicaid. The administrative agency may additionally, or in the alternative, be associated with a regulatory program, such as the Environmental Protection Agency or the Securities and Exchange Commission. For example, the professional may be a worker at a department of motor vehicles. Upon arriving to obtain a driver's license, the client may enter information into their smart phone regarding their qualifications. Upon being assigned to a specific worker, the client will pair their smart phone with that worker to provide all the needed information to the worker. This prevents the worker from having to manually enter the information.

Embodiments of the invention are directed to the exemplary field of sales, financing, and other commercial services. For example, the client may be a customer that is purchasing a vehicle. The professional is a salesperson or a finance representative. While waiting for the professional to be assigned or available, the customer may enter information regarding desired features, credit history, and other information.

Figure 4:
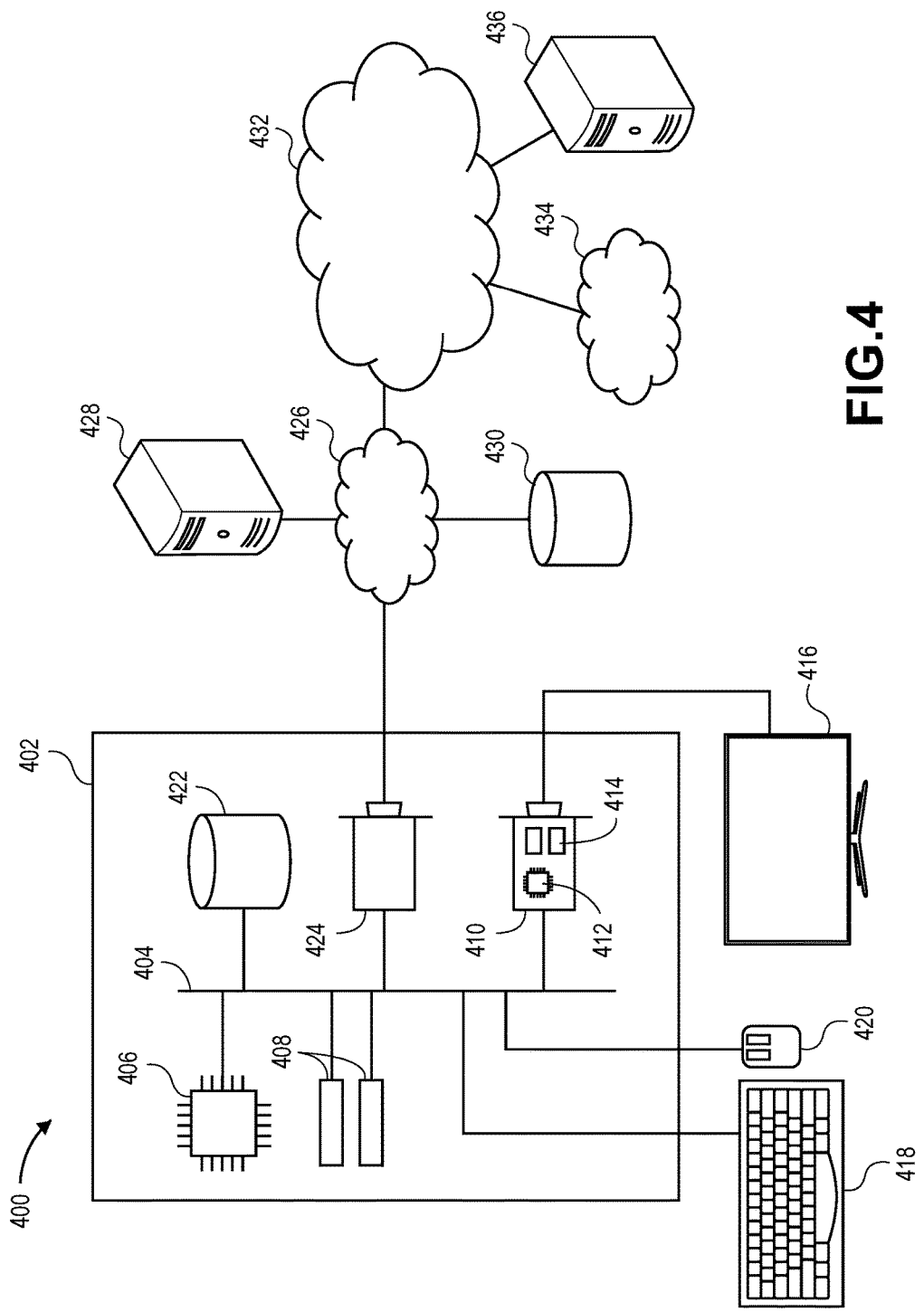
FIG. 4 is a system hardware diagram illustrating various hardware components of the system.

Turning to FIG. 4, the physical hardware that makes up the system will now be discussed. The system 400 comprising an exemplary hardware platform that can form one element of certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408.

Also attached to system bus 404 is graphics card 410. In some embodiments, graphics card 404 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Local network 426 is in turn connected to Internet 432, which connects many networks such as local network 426, remote network 434 or directly attached computers such as computer 436. In some embodiments, computer 402 can itself be directly connected to Internet 432.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Some accounts may be previously existing, such as associated with a tax return preparation program. Each type of user account may provide their respective users with unique roles, capabilities, and permissions with respect to implementing embodiments of the invention. For instance, the user may be provided with a user account that permits the user to access embodiments of the invention that are applicable to assisting the professional in performing the professional services. Additionally, the tax professional or financial professional may be provided with a tax/financial professional account that permits the tax professional or financial professional to access embodiments of the invention that are applicable to accessing documents, verifying their customer, preparing the tax return, etc. In addition, any number and/or any specific types of account are provided to carry out the functions, features, and/or implementations of the invention. Upon the user, tax professional, and/or financial professional logging in to the electronic resource for a first time, they may be required to provide various pieces of identification information to create their respective accounts. Such identification information may include, for instance, personal name, business name, email address, phone number, or the like. Upon providing the identification information, the taxpayer, third party, and/or tax professional may be required to enter (or may be given) a username and password, which will be required to fully access the user account.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for pairing a client device to assist a professional with performing professional services, the system comprising:
    a workstation associated with the professional,
    wherein the workstation creates a code indicative of the workstation,
    wherein the workstation displays the code on a display of the workstation such that the client device can capture the code; and
    a server communicatively coupled with the workstation and the client device,
    wherein the server is configured to receive a set of credentials from the client device,
    wherein the set of credentials includes information indicative of the code that was displayed on the workstation,
    wherein the server analyzes the set of credentials to identify said workstation,
    wherein the server pairs the client device with the workstation based upon said analysis of the code,
    wherein said pairing allows the client device to send, to the workstation, information entered into the client device to be utilized by the professional with performing professional services,
    wherein said pairing allows the workstation to send, to the client device, information entered into the workstation to be reviewed by the client.

2. The system of claim 1, wherein the client device is owned and controlled by the client.

3. The system of claim 1,
    wherein at least a portion of the information entered into the client device was entered prior to the workstation creating the code,
    wherein at least a portion of the information entered into the workstation was entered after the workstation created the code.

4. The system of claim 1, wherein the client device captures the code displayed on the display of the workstation by taking a photograph of said code utilizing a camera of the client device.

5. The system of claim 1,
    wherein the client device is controlled by the professional and allocated to the client while the client is at a professional location associated with the professional,
    wherein the client device is a first client device and is member of a set of client devices,
    wherein the first client device is assigned to the user from the set of client devices at the professional location,
    wherein said set of credentials includes information indicative of the first client device such that the server can identify that the first client device is to be paired with the workstation.

6. The system of claim 1,
    wherein said workstation is a first workstation and is a member of a set of workstations,
    wherein the server identifies that the first workstation is to be paired with the client device based upon said analysis of the said information indicative of the code in said set of credentials.

7. The system of claim 1,
wherein at least a portion of the code that is displayed on the workstation is indicative of a portion of an internet protocol address of the workstation,
wherein the client device combines said portion of the internet protocol address of the workstation with an internet protocol of the client device to fully determine the internet protocol address of the workstation.

8. The system of claim 7, wherein the server determines to pair the client device with the workstation based upon the client device providing said fully determined internet protocol address of the workstation.

9. The system of claim 1, wherein the code that is displayed on the display of the workstation includes a security password.

10. The system of claim 9,
wherein the server verifies that the security password provided by the client device matches the security password displayed in the code,
wherein the server determines that the client device is physically proximate to the workstation based upon the client device providing the security password to the server.

11. The system of claim 1, wherein the professional services are in a field that is selected from the group consisting of tax return preparation, financial services, medical services, government agencies, and commercial services.

12. A system to assist a professional with performing professional services, the system comprising:
a first computing device is configured to present a code indicative of the first computing device,
wherein the first computing device displays the code on a display of the first computing device;
a second computing device configured to capture the code displayed on the display of the first computing device; and
a server communicatively coupled with the first computing device and the second device,
wherein the server is configured to receive a set of credentials from the second computing device,
wherein the set of credentials includes information indicative of the code that was displayed on the first computing device,
wherein the server analyzes the set of credentials to identify the first computing device,
wherein the server pairs the first computing device with the second computing device based upon said analysis of the code,
wherein said pairing allows the first computing device to send, to the workstation, information entered into the client device to be utilized by the professional with performing professional services,
wherein said pairing allows the second computing device to send, to the first computing device, information entered into the second computing device to be reviewed by the client.

13. The system of claim 12,
wherein the first computing device is a workstation utilized by the professional in performing the professional services,
wherein the second computing device is a client device utilized by a client to provide information to the professional,
wherein at least a portion of the information entered into the client device was entered prior to the workstation creating the code,
wherein at least a portion of the information entered into the workstation was entered after the workstation created the code.

14. The system of claim 13,
wherein the workstation is selected from the group consisting of a laptop computer and a desktop computer,
wherein the client device is selected from the group consisting of a smart phone and a tablet computer.

15. The system of claim 12,
wherein the first computing device is a client device utilized by a client to provide information to the professional,
wherein the second computing device is a workstation utilized by the professional in performing the professional services,
wherein at least a portion of the information entered into the client device was entered prior to the workstation creating the code,
wherein at least a portion of the information entered into the workstation was entered after the workstation created the code.

16. The system of claim 12,
wherein at least a portion of the code that is displayed on the first computing device is indicative of a portion of an internet protocol address of the first computing device,
wherein the second computing device combines said portion of the internet protocol address of the first computing device with an internet protocol of the second computing device to fully determine the internet protocol address of the first computing device,
wherein the server determines to pair the second computing device with the first computing device based upon the second computing device providing said fully determined internet protocol address of the first computing device.

17. The system of claim 12,
wherein the code that is displayed on the display of the first computing device includes a security password,
wherein the server verifies that the security password provided by the client device matches the security password displayed in the code,
wherein the server determines that the second computing device is physically proximate to the first computing device based upon the second computing device providing the security password to the server.

18. A computerized method of pairing a client device to a workstation, wherein the client device is associated with a client and the workstation is associated with a professional performing professional services, the method comprising the following steps:
acquiring a set of workstation information from the workstation that is indicative of the workstation;
receiving a set of credentials from the client device,
wherein at least a portion of the set of credentials includes information indicative of a code displayed on a display of the workstation, said code being captured by the client device;
comparing the set of credentials to the set of workstation information to determine that the client device should be paired to the workstation; and
pairing the client device to the workstation such that the client device and the workstation are configured to exchange information, wherein said pairing allows the client device to send, to the workstation, information entered into the client device to be utilized by the professional with performing professional services, wherein said pairing allows the workstation to send, to the client device, information entered into the workstation to be reviewed by the client, wherein at least a portion of the information entered into the client device was entered prior to the workstation creating the code, wherein at least a portion of the information entered into the workstation was entered after the workstation created the code.

19. The computerized method of claim 18, wherein at least a portion of the code that is displayed on the workstation is indicative of a portion of an internet protocol address of the workstation, wherein the client device combines said portion of the internet protocol address of the workstation with an internet protocol of the client device to fully determine the internet protocol address of the workstation, wherein the server determines to pair the client device with the workstation based upon the client device providing said fully determined internet protocol address of the workstation.

\* \* \* \* \*